(12) United States Patent
Ming et al.

(10) Patent No.: US 11,400,751 B2
(45) Date of Patent: Aug. 2, 2022

(54) MOUNTABLE WHEEL CAP

(71) Applicant: HSMA, LLC, Brentwood, TN (US)

(72) Inventors: Darron Ming, Brentwood, TN (US); Asa Hazelwood, Brentwood, TN (US); Eric Richard Larson, Brentwood, TN (US); Kevin Paul Shatzer, Brentwood, TN (US); James Dow Smith, Brentwood, TN (US)

(73) Assignee: HSMA, LLC, Brentwood, TN (US)

( * ) Notice: Subject to any disclaimer, the term of this patent is extended or adjusted under 35 U.S.C. 154(b) by 0 days.

(21) Appl. No.: 17/186,109

(22) Filed: Feb. 26, 2021

(65) Prior Publication Data
US 2021/0178807 A1 Jun. 17, 2021

Related U.S. Application Data

(63) Continuation of application No. PCT/US2020/054233, filed on Oct. 5, 2020.
(Continued)

(51) Int. Cl.
*B60B 7/02* (2006.01)
*B60B 7/00* (2006.01)
(Continued)

(52) U.S. Cl.
CPC ............. *B60B 7/0013* (2013.01); *B60B 7/02* (2013.01); *B60B 7/066* (2013.01); *B60B 7/08* (2013.01);
(Continued)

(58) Field of Classification Search
CPC ......... B60B 7/0013; B60B 7/066; B60B 7/08; B60B 7/02; B60B 2900/121; B60B 2360/32; B60B 2900/1216
See application file for complete search history.

(56) References Cited

U.S. PATENT DOCUMENTS 2,857,024 A * 10/1958 Lyon ................. B60B 7/08
188/264 W
2,857,206 A * 10/1958 Lyon ................. B60B 7/08
301/37.39
(Continued)

FOREIGN PATENT DOCUMENTS

| JP | 03-107203 U | 11/1991 |
|---|---|---|
| JP | 07-009476 A | 1/1995 |
| KR | 10-2001-0063152 A | 7/2001 |

OTHER PUBLICATIONS

International Searching Authority: International Search Report and the Written Opinion or corresponding International Patent Application No. PCT/US2020/054233 dated Jan. 29, 2021, 10 pages.
(Continued)

*Primary Examiner* — Scott A Browne
(74) *Attorney, Agent, or Firm* — Patterson Intellectual Property Law, P.C.; Edward D. Lanquist, Jr.; Alex H. Huffstutter

(57) ABSTRACT

Apparatuses, systems, and methods are provided for improving fuel efficiency of a vehicle using a mountable wheel cap coupleable to a wheel. The mountable wheel cap includes a center section and an outer section. The outer section includes a plurality of tabs extending outwardly from the center section, and at least one gripper section coupled to at least one of the plurality of tabs, the at least one gripper section including a gripper configured to be placed in contact with the at least one of the outer section and/or the outer lip to secure the mountable wheel cap to the wheel.

13 Claims, 15 Drawing Sheets

Related U.S. Application Data

(60) Provisional application No. 62/910,975, filed on Oct. 4, 2019.

(51) Int. Cl.
 B60B 7/06 (2006.01)
 B60B 7/08 (2006.01)

(52) U.S. Cl.
 CPC ..... *B60B 2360/32* (2013.01); *B60B 2900/121* (2013.01)

(56) References Cited

U.S. PATENT DOCUMENTS

| | | | | |
|---|---|---|---|---|
| 2,857,209 A * | 10/1958 | Lyon | .......................... | B60B 7/08 301/37.35 |
| 3,022,112 A * | 2/1962 | Mulhern | ................... | B60B 7/08 301/37.39 |
| 3,078,123 A * | 2/1963 | Frame | ....................... | B60B 7/02 301/37.39 |
| 3,883,181 A * | 5/1975 | Dissinger | ................... | B60B 7/08 301/37.42 |
| 4,671,575 A * | 6/1987 | Pfeiffer | ..................... | B60B 7/08 301/37.24 |
| 5,131,727 A * | 7/1992 | Johnson | .................... | B60B 7/02 301/37.41 |
| 6,443,531 B1 | 9/2002 | Hogan et al. | | |
| 6,457,780 B1 * | 10/2002 | Ernst | ......................... | B60B 7/02 301/37.103 |
| 2011/0062771 A1 * | 3/2011 | Capuzzi | ..................... | B60B 7/08 301/108.1 |
| 2017/0341463 A1 | 11/2017 | Takeda et al. | | |

OTHER PUBLICATIONS

Canadian Intellectual Property Office: Office Action dated Aug. 6, 2021, in corresponding Canadian Application No. 3,119,844, 4 pages.

* cited by examiner

MOUNTABLE WHEEL CAP

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application is a continuation of Patent Cooperation Treaty Application PCT/US2020/054233, filed on Oct. 5, 2020 and entitled "Mountable Wheel Cap," which claims benefit of U.S. Provisional Patent App. No. 62/910,975 filed Oct. 4, 2019 entitled "Mountable Wheel Cap," each of which are fully incorporated herein by reference in its entirety.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND

The present disclosure relates generally to apparatuses, systems, and methods for providing a mountable wheel cap and methods of use. Although modern cars and trucks have increased fuel economy compared to their predecessors, additional fuel economy can both decrease the cost of operating a vehicle and decrease environmental pollution. Wheel covers have been used in various fields for various uses, but lack a lightweight, aerodynamic design and material capable of providing the benefits of the mountable wheel cap of the present disclosure. Furthermore, existing wheel covers require the use of tools or special equipment to install, adjust, or remove.

SUMMARY

Embodiments of the present disclosure provide apparatuses, systems, and methods for providing a mountable wheel cap. The mountable wheel cap may be used to reduce drag across a wheel of a vehicle or trailer and may thereby increase fuel efficiency by reducing fuel consumption.

According to a first aspect of the present disclosure, provided is a mountable wheel cap for coupling to a wheel. The mountable wheel cap includes a center section and an outer section. The outer section includes a plurality of tabs extending outwardly from the center section, and at least one gripper section coupled to at least one of the plurality of tabs, the at least one gripper section including a gripper configured to be placed in contact with the wheel to secure the mountable wheel cap to the wheel.

The outer section may include at least one slot, the at least one slot having an opening through the outer section configured to permit the mountable wheel cap to be removed from the wheel.

The at least one slot may be positioned adjacent to at least one of the plurality of tabs.

The mountable wheel cap may mount to the wheel in a mounting direction, and the center section may include a domed section configured to extend outwardly opposite the mounting direction.

The at least one gripper may be placed in contact with both an outer lip of the wheel and an outer section of the wheel.

The mountable wheel cap may be secured to the wheel using only contact between the at least one gripper and the wheel.

The mountable wheel cap may be formed of a nylon-66 material.

A further aspect of the present disclosure relates to a system for increasing fuel economy by reducing fuel consumption of a vehicle upon which one or more covers are mounted, and/or one or more moveable elements coupled to the vehicle and having one or more covers mounted thereto. The system includes a wheel having an outer section and an outer lip and a mountable wheel cap. The mountable wheel cap includes a center section and an outer section. The outer section includes a plurality of tabs extending outwardly from the center section and at least one gripper section coupled to at least one of the plurality of tabs, the at least one gripper section including a gripper configured to be placed in contact with the at least one of the outer section or the outer lip to secure the mountable wheel cap to the wheel.

The outer section includes at least one slot, the at least one slot having an opening through the outer section to permit the mountable wheel cap to be removed from the wheel.

The at least one slot may be positioned adjacent to at least one of the plurality of tabs.

The mountable wheel cap may mount to the wheel in a mounting direction, and the center section may include a domed section configured to extend outwardly opposite the mounting direction.

The at least one gripper may be placed in contact with both the outer lip of the wheel and to the outer section of the wheel to secure the mountable wheel cap to the wheel.

The mountable wheel cap may be secured to the wheel using only contact between the at least one gripper and the wheel.

The mountable wheel cap may be formed of a nylon-66 material.

The center section may include a domed section configured to extend outwardly opposite a mounting direction of the mountable wheel cap to the wheel, and further wherein the domed section comprises a parabolic ora circular shape.

Numerous other objects, features, and advantages of the present disclosure will be readily apparent to those skilled in the art upon a reading of the following disclosure when taken in conjunction with the accompanying drawings.

DETAILED DESCRIPTION

Figure 1:
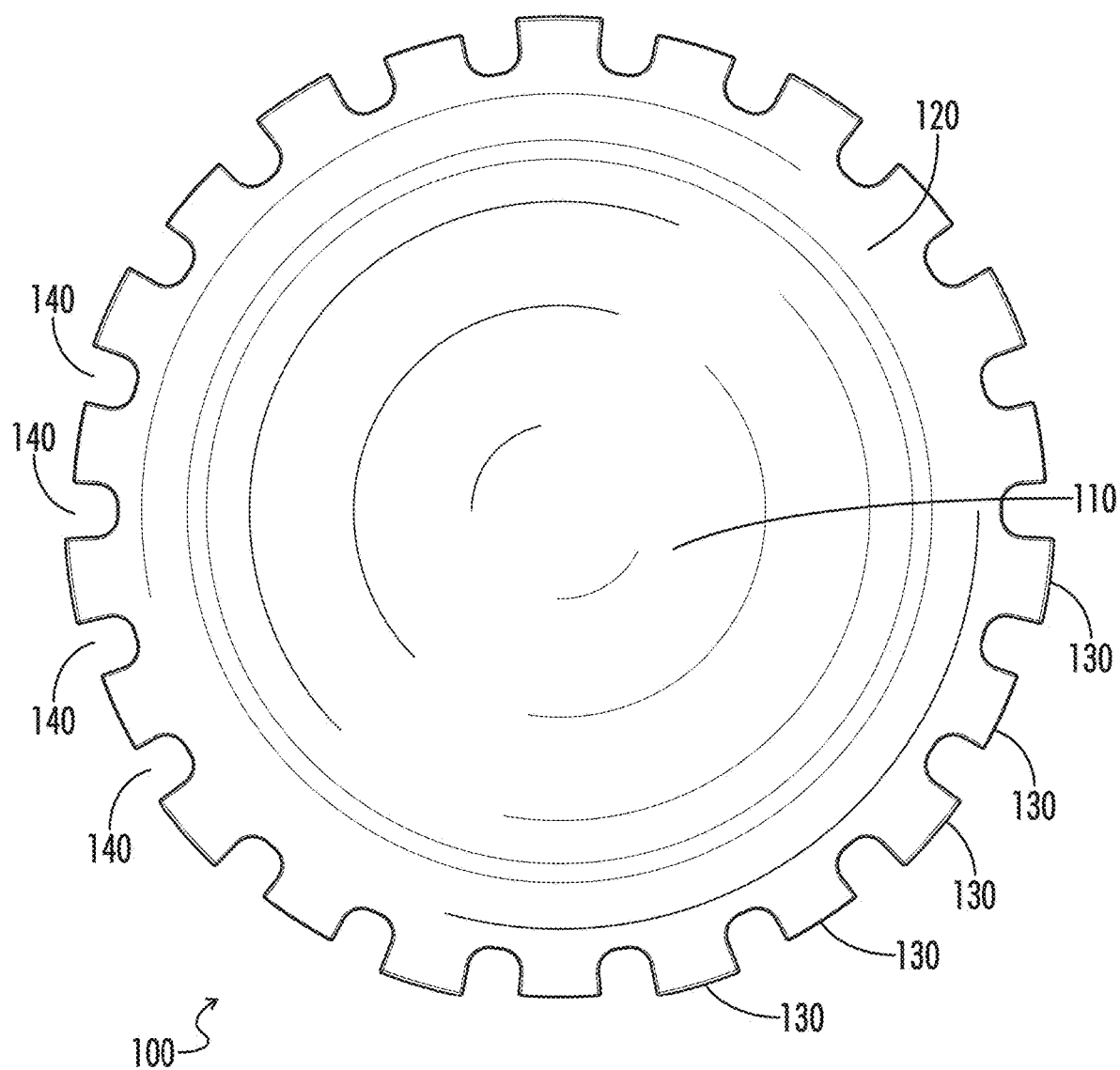
FIG. 1 illustrates a front view of an exemplary embodiment of a wheel cap according to aspects of the present disclosure.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

Referring generally to FIGS. 1-20, various exemplary apparatuses, systems, and associated methods according to the present disclosure are described in detail. Where the various figures may describe embodiments sharing various common elements and features with other embodiments, similar elements and features are given the same reference numerals and redundant description thereof may be omitted below.

Various embodiments of an apparatus according to the present disclosure may provide a mountable wheel cap.

FIG. 1 illustrates a front view of an exemplary embodiment of a wheel cap according to aspects of the present disclosure. The cap 100 includes at least one of a dome 110 and/or outer ring 120. At least a portion of the cap 100 may be configured to be permanently or temporarily coupled to a wheel. In one exemplary embodiment the cap 100 is configured to be coupleable to a rim of a wheel of a vehicle or other moveable object having at least one wheel (such as a trailer). At least a portion of the cap 100 may be formed of a lightweight material. In one exemplary embodiment, at least a portion of the cap 100 and/or the entirety of the cap 100 may be formed of a nylon-66 material. However, one or more additional or alternative lightweight materials may be used without departing from the spirit and scope of the present disclosure. At least a portion of the cap 100 may be configured to redirect airflow to reduce drag in various embodiments. The cap 100 may be used to create an effect of increasing fuel economy, for example by drag reduction across a surface of the cap 100 when in use.

The cap 100 or portion thereof may be configured to provide increased aerodynamic airflow characteristics over a traditional hub or wheel rim. The dome 110 of the cap 100 may extend either outwardly or inwardly relative to a planar surface of the cap 100. For example, at least a portion of the dome 110 may extend outwardly relative to the planar surface of the cap 100 in a convex or concave configuration. At least one characteristic of the dome 110 such as size, shape, or location may be configured to correspond to a component of a wheel to which the cap 100 is intended to be coupleable. For example, the dome 110 may be configured with sufficient size and shape to provide clearance for a variety of truck and/or trailer hubs. The dome 110 may be further configured to provide a stiffening effect for the overall shape of the cap 100 without adding excessive weight. For purposes of this disclosure, the dome 110 (or 1110) may be referred to as a dome section and as an inner section or center section of the cap 100, 1100, and the outer ring and other elements extending outwardly from the inner section may be referred to collectively as an outer section of the cap 100, 1100.

One or more tabs 130 may extend outwardly from the outer ring 120. A plurality of notches 140 may be formed along a surface of the outer ring 120 (e.g., formed in a space between adjacent tabs 130). The center of gravity of the cap 100 may be located slightly inboard of the wheel rim (e.g., at a base of at least one of the plurality of notches 140), as illustrated, for example, by FIG. 10.

Figure 2:
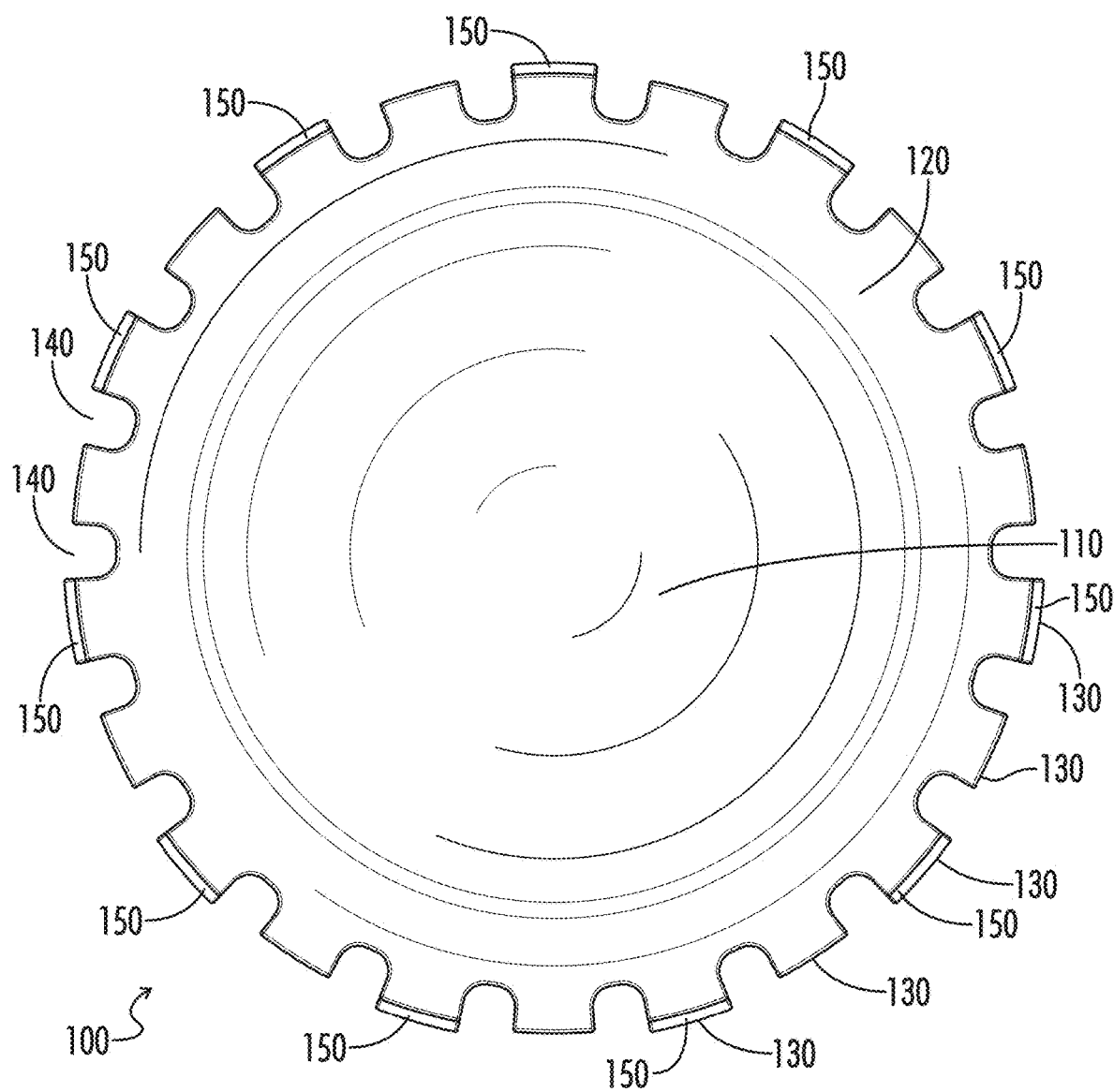
FIG. 2 illustrates an exemplary embodiment of a rear view of a wheel cap according to aspects of the present disclosure.

FIG. 2 illustrates an exemplary embodiment of a rear view of a wheel cap according to aspects of the present disclosure. As illustrated by FIG. 2, at least one gripper tab 150 (e.g., as part of a gripper section including at least a portion of the tab 130 and a curved portion at the end of a tab 130 which functions as a gripping element for coupling to the wheel 1900) may be coupled to or otherwise formed as a part of at least one tab 130. Gripper tabs 150 may be spaced along the wheel rim to provide a secure fit between the cap 100 and wheel rim. Multiple tabs 130 may be used (along with one or more gripper tabs 150) to make the fit adaptable to a damaged or otherwise out-of-round wheel. Tabs 130 may be flexible such that they can be disengaged by hand and/or without the use of tools. As such, unlike existing wheel covers, the cap 100 is capable of mounting to a wheel (e.g., wheel 1900) without the use of any additional mounting or installation tools. Non-gripping tabs 130 may be spaced along the wheel rim to restrict airflow through the wheel (e.g., inboard to outboard flow caused by pressure differentials).

Figure 9:
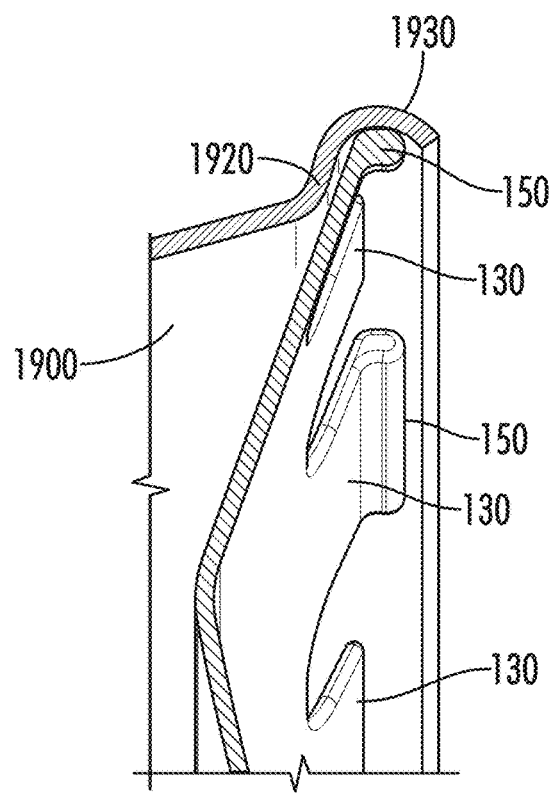
FIG. 9 illustrates a partial view of an exemplary embodiment of a gripper section of a wheel cap according to aspects of the present disclosure.

At least a portion of a tab 130 and/or gripper tab 150 may be configured with an inward sloped section configured to tighten grip between the cap 100 and wheel rim during operation, as illustrated and described herein with reference to FIG. 9. At least one of a size and/or shape of at least one gripper tab 150 may be configured to provide multiple lines of contact with a wheel lip, for example to provide stability, as further illustrated by and described with reference to FIG. 9.

The cap 100 may be configured with any number of tabs 130 and/or gripper tabs 150 without departing from the spirit and scope of the present disclosure. In an exemplary embodiment, the cap 100 may include an odd number of gripper tabs, such as eleven gripper tabs. In other embodiments, there may be a different number of gripper tabs, such as seven gripper tabs. Tabs 130 may be flexible such that they may be installed to a wheel 1900 by hand, without the need to use any tools.

Figure 3:
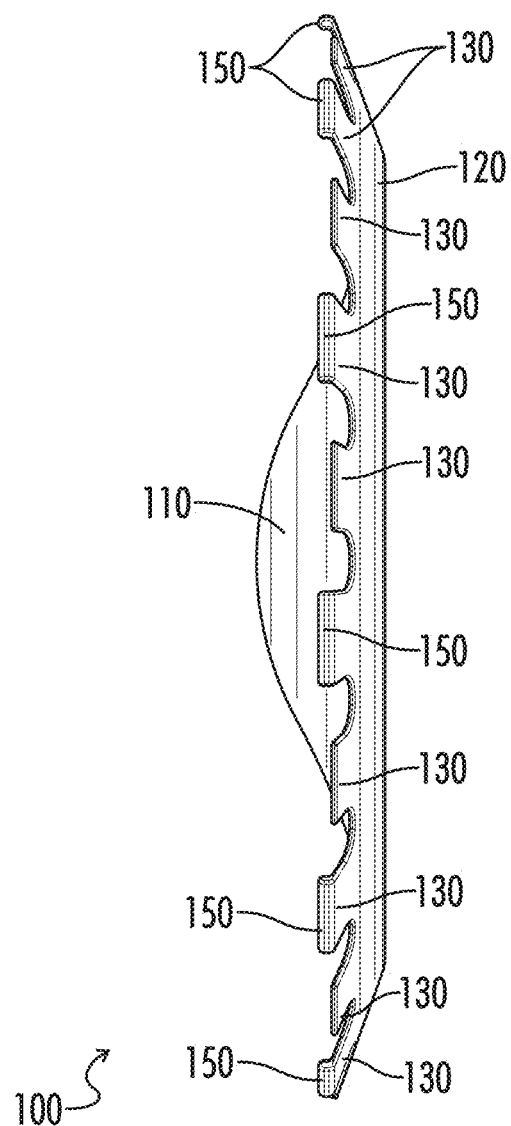
FIG. 3 illustrates a left-side view of an exemplary embodiment of a wheel cap according to aspects of the present disclosure.

FIG. 3 illustrates a left-side view of an exemplary embodiment of a wheel cap according to aspects of the present disclosure.

Figure 4:
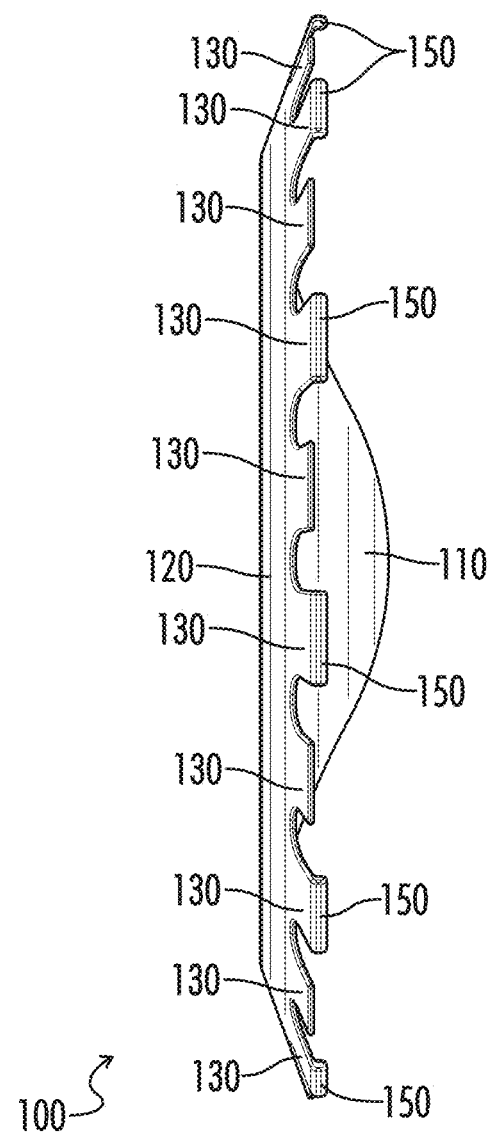
FIG. 4 illustrates a right-side view of an exemplary embodiment of a wheel cap according to aspects of the present disclosure.

FIG. 4 illustrates a right-side view of an exemplary embodiment of a wheel cap according to aspects of the present disclosure.

Figure 5:
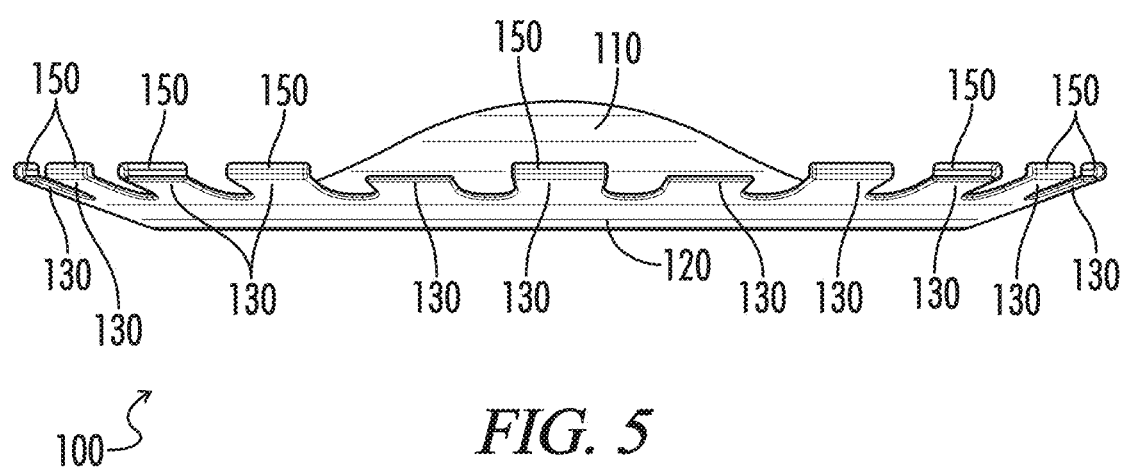
FIG. 5 illustrates a top view of an exemplary embodiment of a wheel cap according to aspects of the present disclosure.

FIG. 5 illustrates a top view of an exemplary embodiment of a wheel cap according to aspects of the present disclosure.

Figure 6:
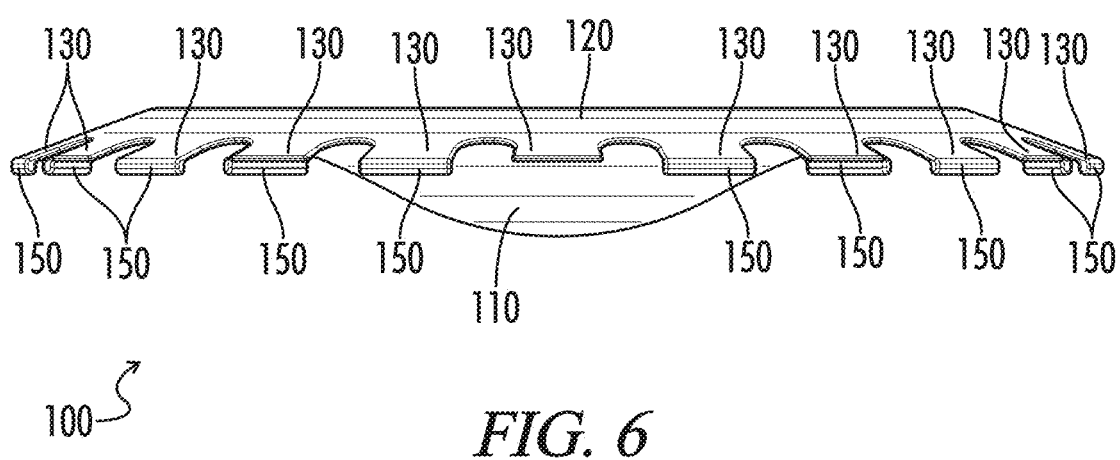
FIG. 6 illustrates a bottom view of an exemplary embodiment of a wheel cap according to aspects of the present disclosure.

FIG. 6 illustrates a bottom view of an exemplary embodiment of a wheel cap according to aspects of the present disclosure.

Figure 7:
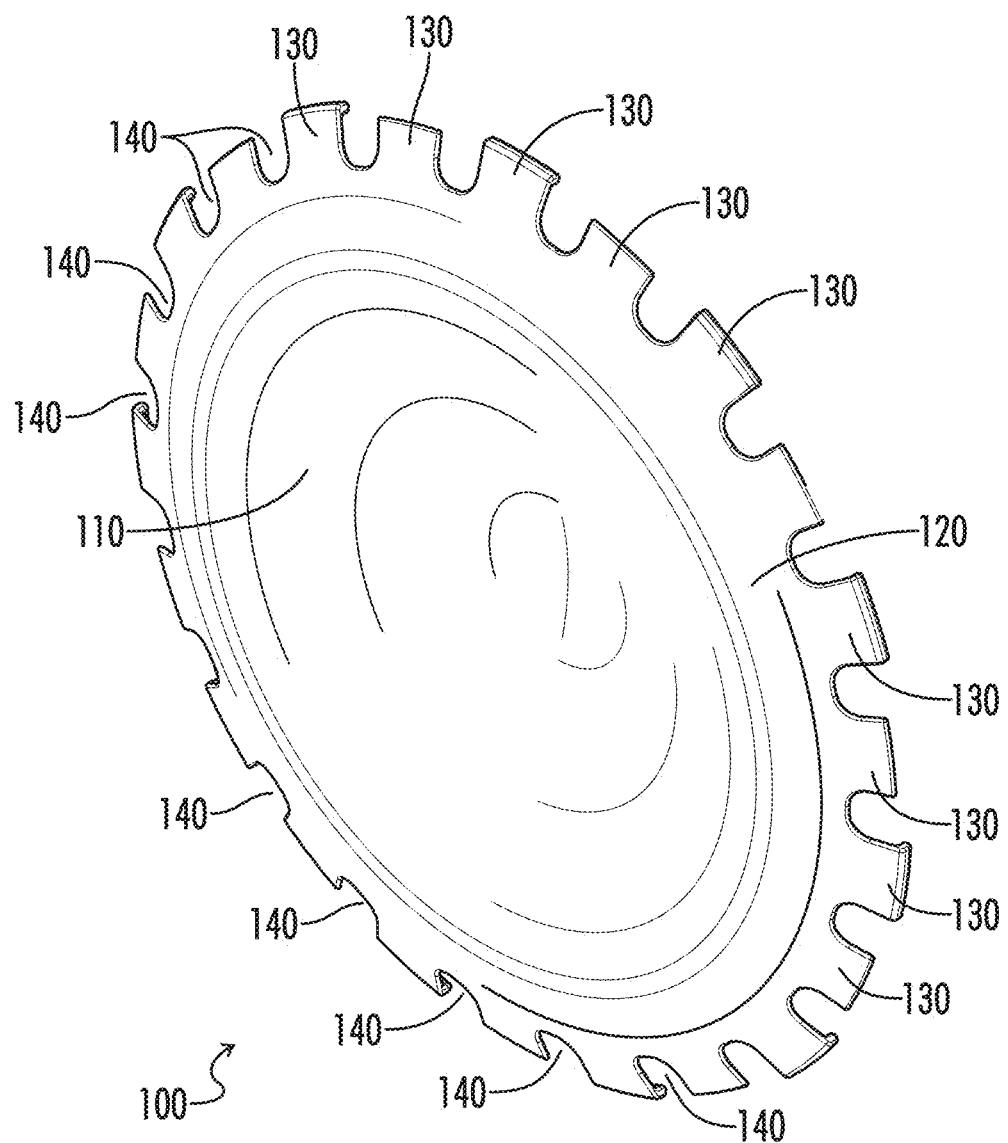
FIG. 7 illustrates a raised right front-side perspective view of an exemplary embodiment of a wheel cap according to aspects of the present disclosure.

FIG. 7 illustrates a raised right front side perspective view of an exemplary embodiment of a wheel cap according to aspects of the present disclosure.

Figure 8:
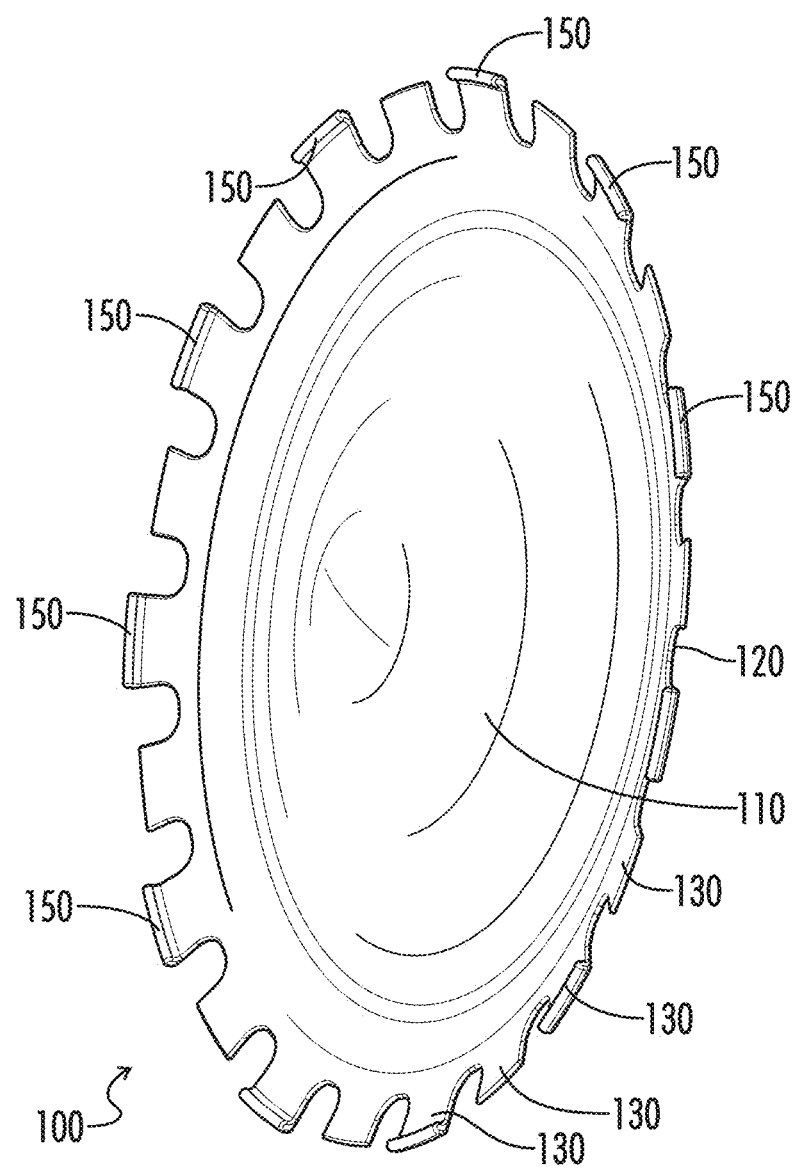
FIG. 8 illustrates a lower right rear-side perspective view of an exemplary embodiment of a wheel cap according to aspects of the present disclosure.

FIG. 8 illustrates a lower right rear side perspective view of an exemplary embodiment of a wheel cap according to aspects of the present disclosure.

FIG. 9 illustrates a partial view of an exemplary embodiment of a gripper section of a wheel cap according to aspects of the present disclosure. The partial view of a cap 100 illustrated by FIG. 9 includes a plurality of gripper tabs 150. Each gripper tab 150 includes a partially rounded shape configured to provide two lines of contact within a wheel lip. This configuration may provide stability of a fit between the cap 100 and a wheel. The cap 100 may include an inward sloped conical section 900 configured such that outwardly directed operational forced may tend to tighten grip between the cap 100 and the rim of a wheel coupled to the cap 100. The cap 100 may be configured to be placed in contact with an outer lip 1930 and/or an outer section 1920 of a wheel 1900, as illustrated and described herein with reference to FIG. 19.

Figure 10:
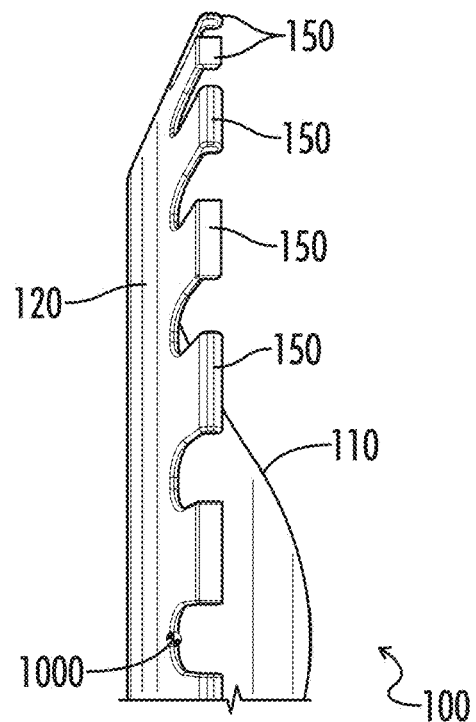
FIG. 10 illustrated a partial view of an exemplary embodiment of a wheel cap and an associated center of gravity according to aspects of the present disclosure.

FIG. 10 illustrated a partial view of an exemplary embodiment of a wheel cap and an associated center of gravity according to aspects of the present disclosure. The cap 100 may include a center of gravity 1000. In various exemplary embodiments, the center of gravity may be located slightly inward of a rim of a wheel coupleable to the cap 100. This configuration may provide that centrifugal force does not tend to roll the cap 100 outward and thus off of the rim of the wheel during use, such as at a high speed such as on a highway. The center of gravity 1000 may be predetermined based at least in part upon a location, size, positioning, and/or ratio between the dome 110, the outer ring 120, one or more gripper tabs 150, or any other property or element of the cap 100.

Figure 11:
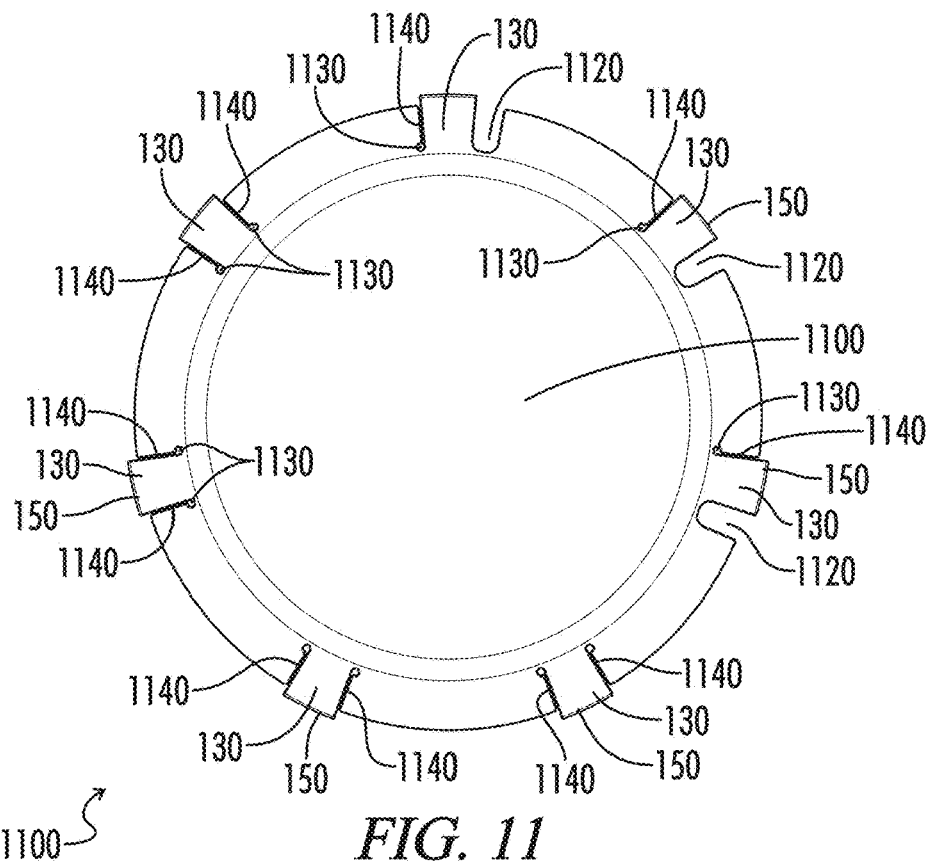
FIG. 11 illustrates a front view of an exemplary embodiment of a wheel cap according to aspects of the present disclosure.
Figure 20A:
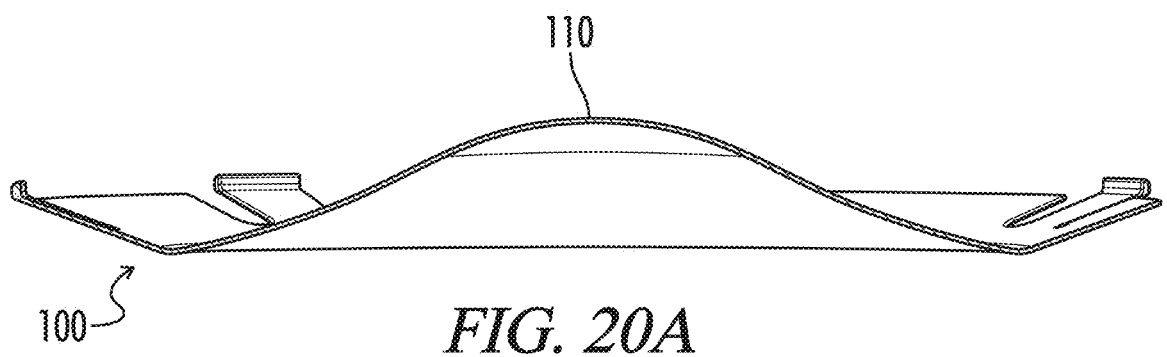
FIG. 20A illustrates a partial top cutaway view of an exemplary embodiment of a wheel cap according to aspects of the present disclosure.
Figure 20B:
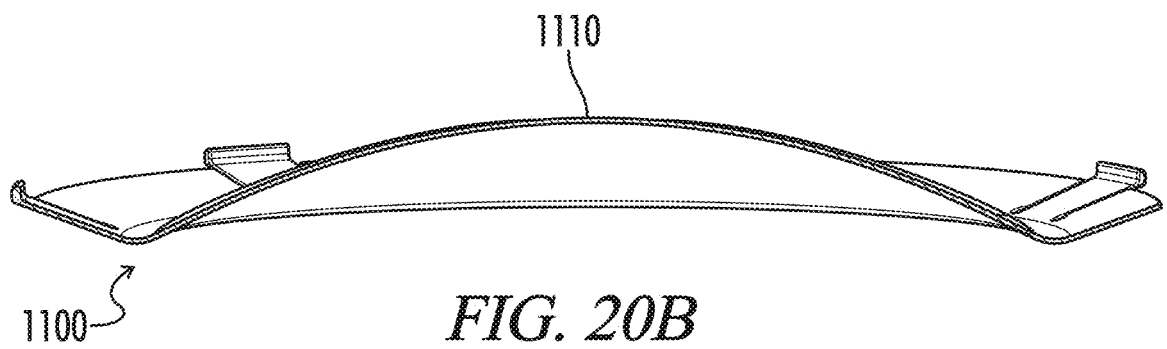
FIG. 20B illustrates partial top cutaway view of an alternative exemplary embodiment of a wheel cap according to aspects of the present disclosure.

FIG. 11 illustrates a front view of an exemplary embodiment of a wheel cap according to aspects of the present disclosure. The cap 1100 includes at least one of a dome 1110 and/or outer ring 120. At least a portion of the cap 1100 may be configured to be permanently or temporarily coupled to a wheel (e.g., wheel 1900). In one exemplary embodiment the cap 1100 is configured to be coupleable to a rim of a wheel of a vehicle or other moveable object having at least one wheel (such as a vehicle or trailer). At least a portion of the cap 1100 may be formed of a lightweight material. The dome 1110 may be configured having a smaller parabolic depth compared to the dome 110 illustrated by FIGS. 1-8. FIGS. 20A and 20B illustrate examples of curvatures of dome 110, 1110 for use with implementations consistent with the present disclosure. The dome 110, 1110 may form a continuous, smooth dome in various embodiments.

In one exemplary embodiment, at least a portion of the cap 1100 and/or the entirety of the cap 1100 may be formed of a nylon-66 material. However, one or more additional or alternative lightweight, sturdy, and/or durable materials may be used without departing from the spirit and scope of the present disclosure. At least a portion of the cap 1100 may be configured to redirect airflow to reduce drag in various embodiments. The cap 1100 may be used to create an effect of increasing fuel economy, for example by drag reduction across a surface of the cap 1100 when in motion.

The cap 1100 includes a plurality of tabs 130 at the outer ring 120 thereof. One or more openings 1120 may be configured adjacent to at least one tab 130. The one or more openings 1120 may be configured to enable a user to access the tab 130 so as to couple to a wheel, to adjust fitting to a wheel, and/or to assist in removing the cap 1100 from a wheel. For example, the one or more openings 1120 may be configured to enable the user to insert a finger into a slot to release a gripper 150 from the wheel to remove the cap 1100. Although there are three openings 1120 illustrated by FIG. 11, it should be apparent that any number of openings 1120 may be provided on the cap 1100 without departing from the spirit and scope of the present disclosure.

One or more slots 1140 may be formed in the cap 1100 at one or more sides of at least one tab 130. In the exemplary embodiment illustrated by FIG. 11 two slots 1140 are formed at opposing longitudinal sides of a tab 130 not having an opening 1120. For tabs 130 having an associated opening 1120, only one corresponding slot 1140 may be associated with a tab 130. Although illustrated as extending in a longitudinal direction of a tab 130 it should be appreciated that one or more slots 1140 may be located at any portion of the cap 1100, whether associated with a tab 130 or independent from any tab 130. Furthermore, the slots 1140 need not be formed in a longitudinal length of a tab 130 but may be formed in any direction, angle, side, or location of a cap 1100. The cap 1100 may include one or more holes 1130 at a base of one or more slots 1140. The one or more holes 1130 may be configured in various embodiments to reduce or minimize a chance of the cap 1100 cracking at the end of a slot 1140 of the cap 1100. In various embodiments, one or more slot 1140 may have a width of less than 0.1 inch, for example having a value of 0.06 inches in one embodiment. One or more holes 1130 may similarly have various sizes according to implementation, and in various embodiments may have a diameter of less than 0.5 inch, with a diameter of 0.25 inch in one embodiment.

Various aspects of the features of the cap 1100 may have aerodynamic advantages over previous designs, including the cap 100. For example, having an increased dome radius and shortened inward height of the outer ring may be effective to reduce severity of the dome section and reduce the depth of the valley contour. In doing so, there may be less disruption of the airflow profile across the wheel and tire assembly coupled to the cap 1100 and there may be lower pressure variations across the flow field. Additionally, by reducing the number of slots around the rim in the cap 1100 versus the cap 100, there may be less air pumped through the wheel due to reduction of open flow areas, and there may be less churning of air passing over the cap 1100 due to the paddle effect.

Figure 12:
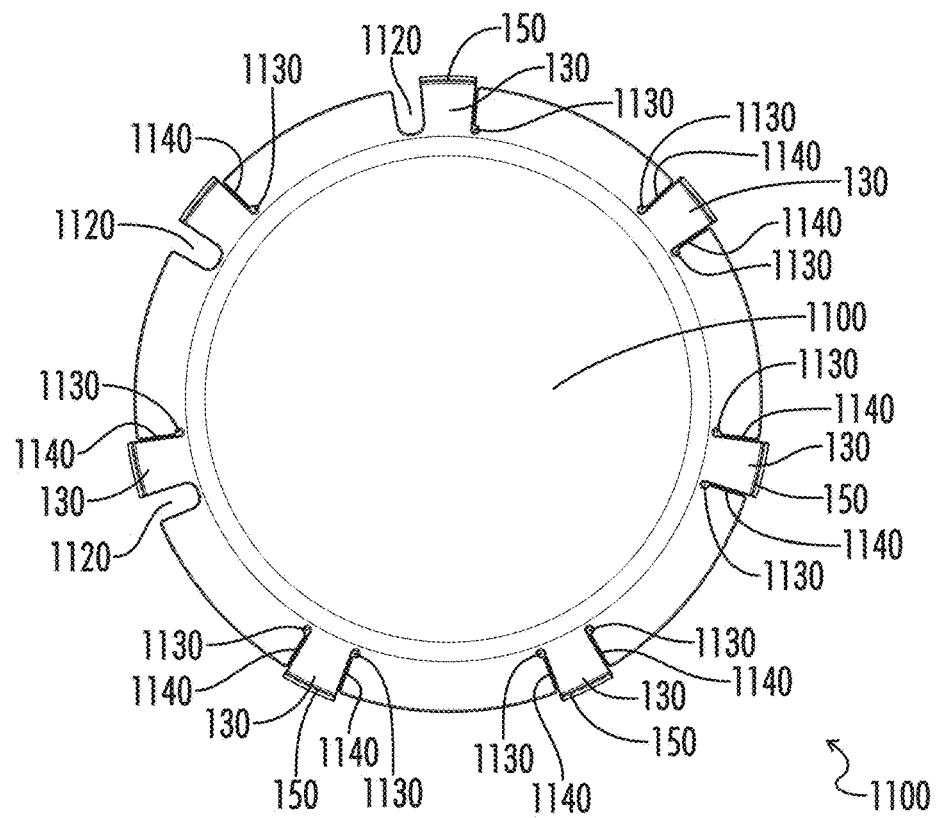
FIG. 12 illustrates a rear view of an exemplary embodiment of a wheel cap according to aspects of the present disclosure.

FIG. 12 illustrates an exemplary embodiment of a rear view of a wheel cap according to aspects of the present disclosure. As illustrated by FIG. 12, at least one gripper tab 150 may be coupled to or otherwise formed as a part of at least one tab 130. Gripper tabs 150 may be spaced along the wheel rim to provide a secure fit between the cap 100 and wheel rim. Multiple tabs 130 may be used (along with one or more gripper tabs 150) to make the fit adaptable to a damaged or otherwise out-of-round wheel. Tabs 130 may be flexible such that they can be disengaged by hand and/or without the use of tools. As such, unlike existing wheel covers, the cap 100 is capable of mounting to a wheel without the use of any additional mounting or installation tools. Non-gripping tabs 130 may be spaced along the wheel rim to restrict airflow through the wheel (e.g., inboard to outboard flow caused by pressure differentials).

The cap 100 may be configured with any number of tabs 130 and/or gripper tabs 150 without departing from the spirit and scope of the present disclosure. In an exemplary embodiment, the cap 100 may include an odd number of gripper tabs, such as eleven gripper tabs.

Figure 13:
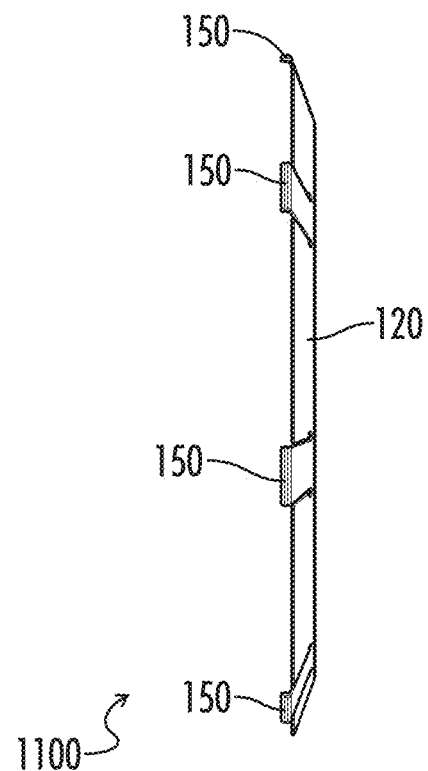
FIG. 13 illustrates a left-side view of an exemplary embodiment of a wheel cap according to aspects of the present disclosure.

FIG. 13 illustrates a left-side view of an exemplary embodiment of a wheel cap according to aspects of the present disclosure.

Figure 14:
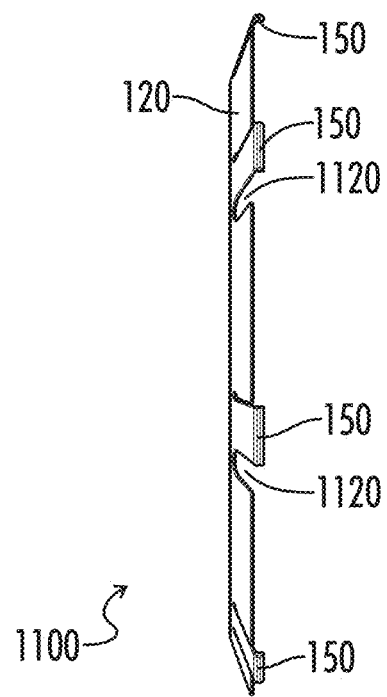
FIG. 14 illustrates a right-side view of an exemplary embodiment of a wheel cap according to aspects of the present disclosure.

FIG. 14 illustrates a right-side view of an exemplary embodiment of a wheel cap according to aspects of the present disclosure.

Figure 15:
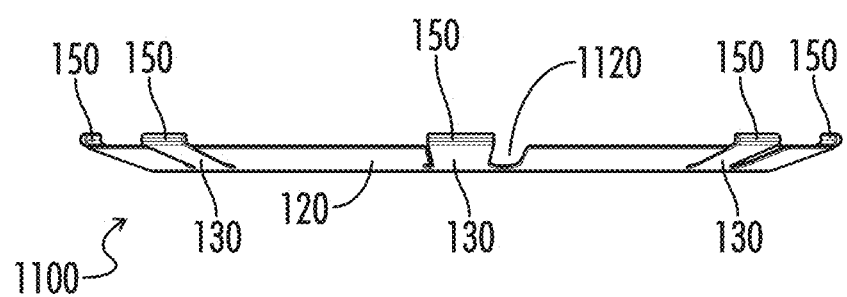
FIG. 15 illustrates a top view of an exemplary embodiment of a wheel cap according to aspects of the present disclosure.

FIG. 15 illustrates a top view of an exemplary embodiment of a wheel cap according to aspects of the present disclosure.

Figure 16:
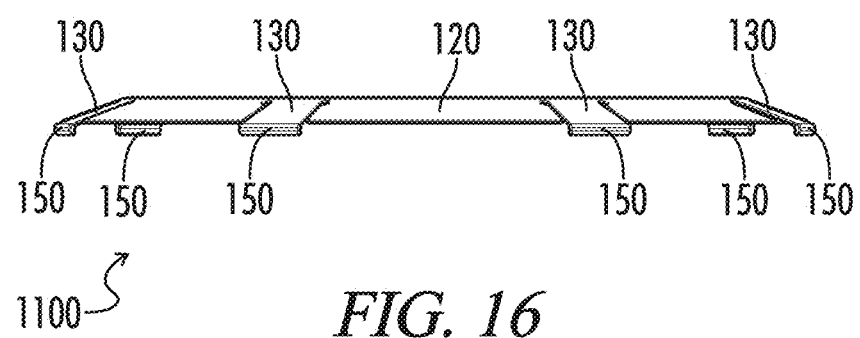
FIG. 16 illustrates a bottom view of an exemplary embodiment of a wheel cap according to aspects of the present disclosure.

FIG. 16 illustrates a bottom view of an exemplary embodiment of a wheel cap according to aspects of the present disclosure.

Figure 17:
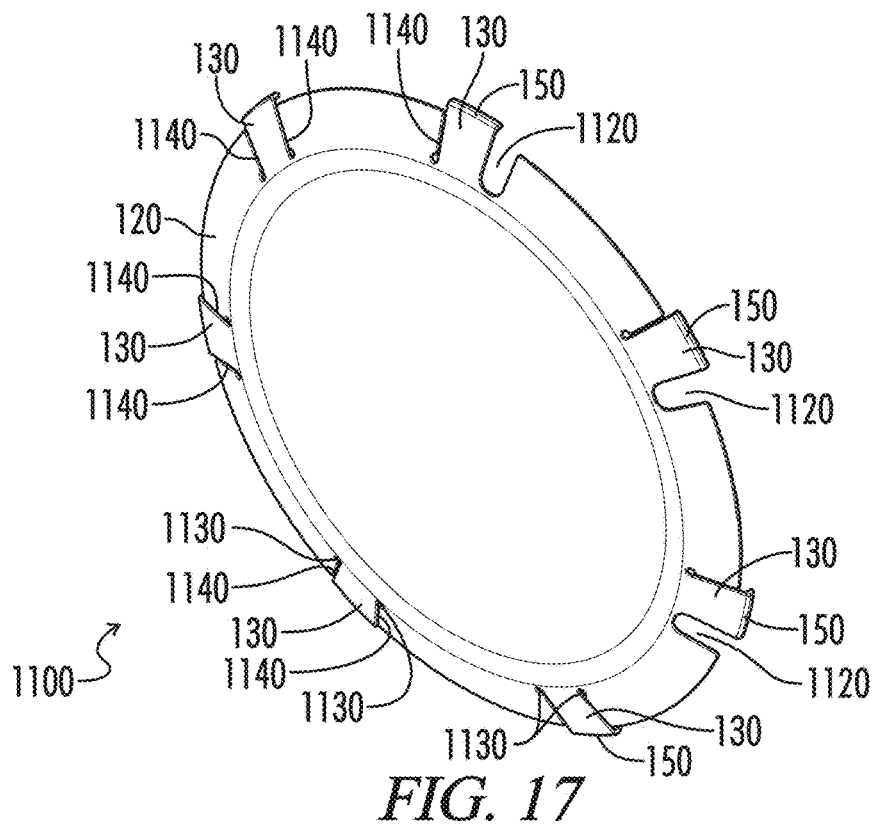
FIG. 17 illustrates a raised right front-side perspective view of an exemplary embodiment of a wheel cap according to aspects of the present disclosure.

FIG. 17 illustrates a raised right front-side perspective view of an exemplary embodiment of a wheel cap according to aspects of the present disclosure.

Figure 18:
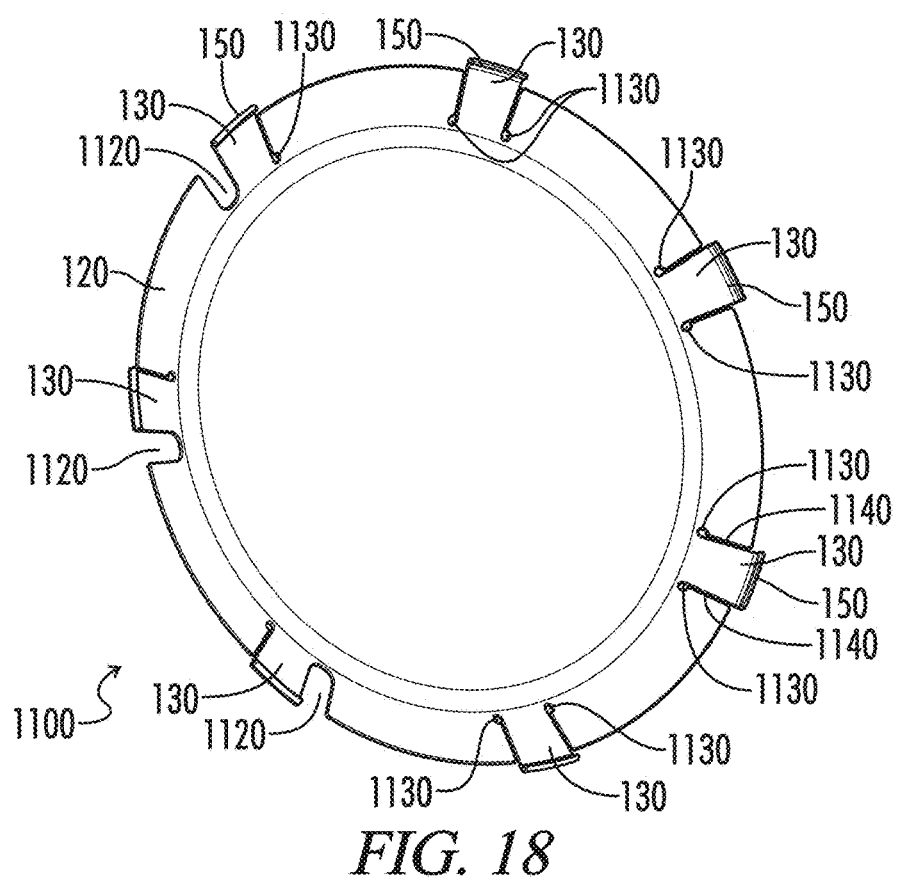
FIG. 18 illustrates a raised left rear-side perspective view of an exemplary embodiment of a wheel cap according to aspects of the present disclosure.

FIG. 18 illustrates a raised left rear-side perspective view of an exemplary embodiment of a wheel cap according to aspects of the present disclosure.

Figure 19:
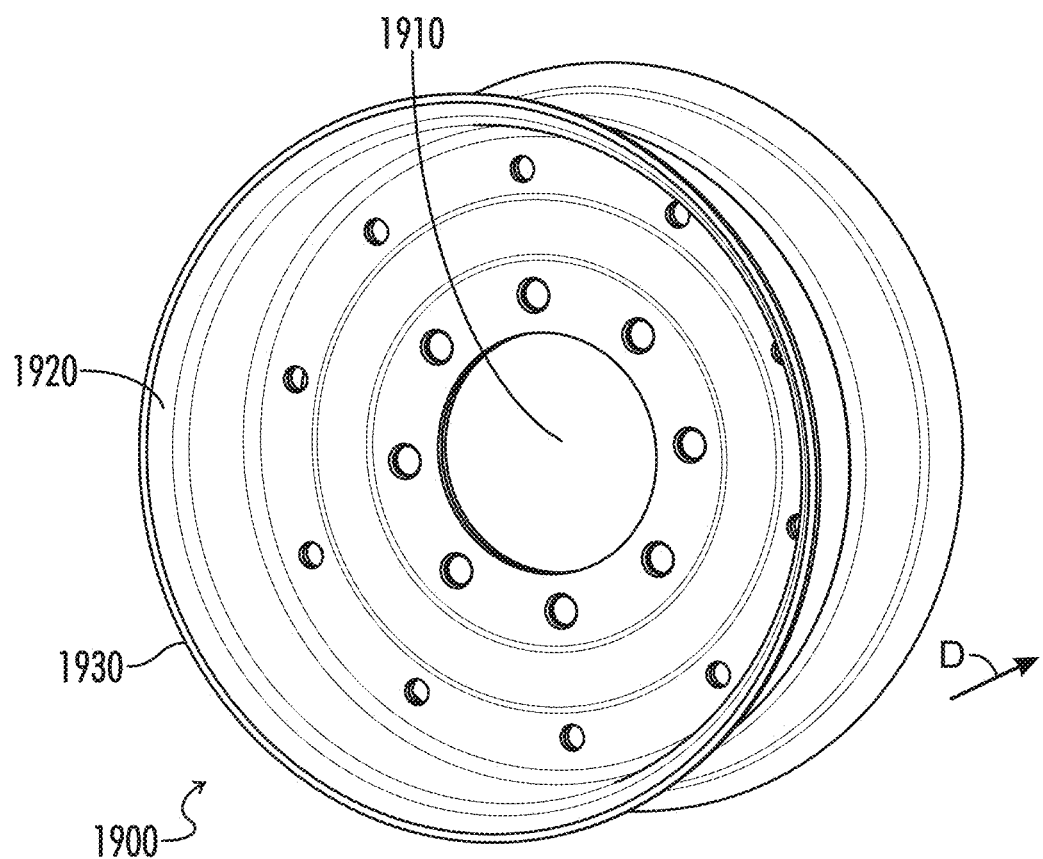
FIG. 19 illustrates a front right-side raised perspective view of a related art wheel capable of use with a wheel cap according to aspects of the present disclosure.

FIG. 19 illustrates a front right-side raised perspective view of a related art wheel capable of use with a wheel cap according to aspects of the present disclosure. The wheel 1900 includes a hub section 1910, an outer section 1920, and an outer lip 1930. The hub section 1910 may be used to couple the wheel 1900 to a moving element, such as a vehicle or trailer. Extending outwardly from the hub section 1910, the wheel includes an outer section 1920. The outer section may include or otherwise be coupled to the outer lip 1930. In various embodiments, the cap 100 and/or cap 1100 may be configured to couple to the wheel 1900 at the outer section 1920 and/or outer lip 1930. For example, the embodiment illustrated by FIG. 9 reflects a cap 100 in contact with both an outer lip 1930 of the wheel and the outer section 1920 of the wheel 1900. The cap 100, 1100 may be configured to couple to the wheel 1900 in a mounting direction D, which may be inwardly into the wheel 190 in the direction of the hub section 1910. One or more of the openings 1120 of the cap 1100 may be configured to permit the user to fit his or her finger or a tool between the cap 1100 and the wheel 1900 to remove or adjust the cap 1100 when coupled to the wheel 1900.

FIG. 20A illustrates a partial top cutaway view of an exemplary embodiment of a wheel cap according to aspects of the present disclosure. FIG. 20B illustrates partial top cutaway view of an alternative exemplary embodiment of a wheel cap according to aspects of the present disclosure. As illustrated by FIGS. 20A and 20B, both the curvature and depth of the domed section 110, 1110 may vary according to different implementations. In various embodiments, a size, shape, or other property of the domed section 110, 1110 may be selected, predetermined, or adapted to provide clearance for a variety of hubs and hub elements, including hub odometers, as well as providing a stiffening effect for the overall shape of the cap, without adding excessing weight. For example, the curvature of the domed section 110 of the cap 100 illustrated by FIG. 20A is parabolic in nature and has a deeper depth than the domed section 1110 of the cap 1100 illustrated by FIG. 20B, which has a more circular curvature and less of a depth than that of the cap 100 of FIG. 20A. A size, shape, and/or configuration of the domed section 110, 1110 of the cap 100, 1100 may vary based on one or more parameters associated with the cap 100 or 1100, the wheel 1900, a desired aerodynamic parameter or benefit, or any other parameter associated with the system.

Implementations consistent with the present disclosure are capable of providing impactful fuel savings, for example when applied to commercial vehicles such as trucks hauling trailers. For example, testing of the cap 100 on both trucks and trucks with trailers reflects between 0.1% to 0.4% fuel economy improvement ranging from caps 100 on only a trailer to caps 100 provided on both a truck and trailer. The features of cap 1100 provide even further fuel savings based on their increased aerodynamic design.

To facilitate the understanding of the embodiments described herein, a number of terms are defined below. The terms defined herein have meanings as commonly understood by a person of ordinary skill in the areas relevant to the present invention. Terms such as "a," "an," and "the" are not intended to refer to only a singular entity, but rather include the general class of which a specific example may be used for illustration. The terminology herein is used to describe specific embodiments of the invention, but their usage does not delimit the invention, except as set forth in the claims. The phrase "in one embodiment," as used herein does not necessarily refer to the same embodiment, although it may.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The previous detailed description has been provided for the purposes of illustration and description. Thus, although there have been described particular embodiments of a new and useful invention, it is not intended that such references be construed as limitations upon the scope of this invention except as set forth in the following claims.

What is claimed is:

1. A mountable wheel cap for coupling to a wheel, comprising:
    a center section; and
    an outer section including,
        a plurality of tabs extending outwardly from the center section, each tab including an outer peripheral edge;
        at least one gripper section coupled to at least one of the plurality of tabs, the at least one gripper section including a gripper configured to be placed in contact with the wheel to secure the mountable wheel cap to the wheel; and
        a plurality of slots, the plurality of slots comprising (i) an opening through the outer section adjacent to a first side of the at least one of the plurality of tabs extending to the outer peripheral edge and configured to permit the mountable wheel cap to be removed from the wheel by releasing the gripper of the at least one gripper section by access through the opening through the outer section, and (ii) a slot through the outer section at a second side of the at least one of the plurality of tabs opposite the first side and extending to the outer peripheral edge, the slot through the outer section having a slot width less than a width of the opening through the outer section, wherein the opening is at least partially defined by the first side of the at least one of the plurality of tabs and the slot is at least partially defined by the second side of the at least one of the plurality of tabs, further wherein a radial length of the slot is substantially equal to a radial length of the opening.

2. The mountable wheel cap of claim 1, wherein the mountable wheel cap is configured to mount to the wheel in a mounting direction, and further wherein the center section comprises a domed section configured to extend outwardly opposite the mounting direction.

3. The mountable wheel cap of claim 1, wherein the at least one gripper is configured to be placed in contact with both an outer lip of the wheel and an outer section of the wheel.

4. The mountable wheel cap of claim 1, wherein the mountable wheel cap is configured to be secured to the wheel using only contact between the at least one gripper and the wheel.

5. The mountable wheel cap of claim 1, wherein the mountable wheel cap is formed of a nylon-66 material.

6. A system for increasing fuel efficiency for a vehicle, comprising:
    a wheel having an outer section and an outer lip; and
    a mountable wheel cap, including,
        a center section; and
        an outer section including,
            a plurality of tabs extending outwardly from the center section, each tab including an outer peripheral edge;
            at least one gripper section coupled to at least one of the plurality of tabs, the at least one gripper section including a gripper configured to be placed in contact with the at least one of the outer section or the outer lip to secure the mountable wheel cap to the wheel, and
            a plurality of slots, the plurality of slots comprising (i) an opening through the outer section adjacent to a first side of the at least one of the plurality of tabs extending to the outer peripheral edge and configured to permit the mountable wheel cap to be removed from the wheel by releasing the gripper of the at least one gripper section by access through the opening through the outer section, and (ii) a slot through the outer section at a second side of the at least one of the plurality of tabs opposite the first side and extending to the outer peripheral edge, the slot through the outer section having a width less than a width of the opening through the outer section, wherein the opening is at least partially defined by the first side of the at least one of the plurality of tabs and the slot is at least partially defined by the second side of the at least one of the plurality of tabs, wherein a radial length of the opening is substantially equal to a radial length of the slot.

7. The system of claim 6, wherein the mountable wheel cap is configured to mount to the wheel in a mounting direction, and further wherein the center section comprises a domed section configured to extend outwardly opposite the mounting direction.

8. The system of claim 6, wherein the at least one gripper is configured to be placed in contact with both the outer lip of the wheel and to the outer section of the wheel to secure the mountable wheel cap to the wheel.

9. The system of claim 6, wherein the mountable wheel cap is configured to be secured to the wheel using only contact between the at least one gripper and the wheel.

10. The system of claim 6, wherein the mountable wheel cap is formed of a nylon-66 material.

11. The system of claim 6, wherein the center section comprises a domed section configured to extend outwardly opposite a mounting direction of the mountable wheel cap to the wheel, and further wherein the domed section comprises a parabolic or a circular shape.

12. The mountable wheel cap of claim 1, wherein the slot width is less than 0.1 inch.

13. The system of claim 6, wherein the slot width is less than 0.1 inch.

* * * * *